United States Patent [19]

Schmidt et al.

[11] Patent Number: 5,699,741

[45] Date of Patent: Dec. 23, 1997

[54] DOCUMENT PRINTER AND A PROCESS FOR REGISTERING THE DOCUMENTS BY MEANS OF CONTROL MARKINGS USING THIS DOCUMENT PRINTER

[75] Inventors: Peter Schmidt; Wolfgang Heise, both of Paderborn; Bernhard Lappe, Büren, all of Germany

[73] Assignee: Siemens Nixdorf Informationssysteme Aktiengesellschaft, Paderborn, Germany

[21] Appl. No.: 525,672

[22] PCT Filed: Jan. 27, 1994

[86] PCT No.: PCT/DE94/00072

§ 371 Date: Sep. 25, 1995

§ 102(e) Date: Sep. 25, 1995

[87] PCT Pub. No.: WO94/22117

PCT Pub. Date: Sep. 29, 1994

[30] Foreign Application Priority Data

Mar. 23, 1993 [DE] Germany ............... 43 09 309.4

[51] Int. Cl.⁶ ................................................ B41F 13/24
[52] U.S. Cl. ................ 101/485; 400/582; 400/708; 400/621; 250/559.06
[58] Field of Search .................................. 101/483, 485; 400/708, 621, 582; 250/559.01, 559.06

[56] References Cited

U.S. PATENT DOCUMENTS

| | | | |
|---|---|---|---|
| 3,684,076 | 8/1972 | Crain et al. | 400/708 |
| 4,594,597 | 6/1986 | Liu et al. | 400/708 |
| 4,743,129 | 5/1988 | Keryhuel et al. | 400/708 |

FOREIGN PATENT DOCUMENTS

| | | | |
|---|---|---|---|
| 0341524 | 11/1989 | European Pat. Off. | |
| 0354260 | 2/1990 | European Pat. Off. | |
| 0492900 | 7/1992 | European Pat. Off. | |
| 3514062 | 10/1986 | Germany | |
| 3528199 | 12/1987 | Germany | |
| 0110479 | 7/1982 | Japan | 400/621 |
| 401269074A | 10/1989 | Japan | 400/621 |
| 402295774A | 12/1990 | Japan | 400/621 |
| 403239571A | 10/1991 | Japan | 400/621 |
| 404220368A | 8/1992 | Japan | 400/621 |

*Primary Examiner*—Eugene H. Eickholt
*Attorney, Agent, or Firm*—Hill, Steadman & Simpson

[57] ABSTRACT

A document printer, configured as a check printer, in a check dispenser (18) contains a reading device (30), disposed immovably in the delivery-side transport duct (10) of the printer, for registering a consecutive-running control marking imprinted on the reverse of the checks. The reading device makes use of the transport motion of the check, during its passage through the printer and delivery, for scanning purposes.

12 Claims, 2 Drawing Sheets

DOCUMENT PRINTER AND A PROCESS FOR REGISTERING THE DOCUMENTS BY MEANS OF CONTROL MARKINGS USING THIS DOCUMENT PRINTER

BACKGROUND OF THE INVENTION

1. Field of the Invention

The present invention relates generally to a method and apparatus for scanning document codes at an output of a document printer, and particularly at an output of a check printer.

2. Description of the Related Art

Document printers or check printers for the printing of checks or other forms have already been in use in banks or in the retail trade for some considerable time. They generally contain a print head and a transport duct for transporting the ready printed checks to the printer outlet. A device of this type, which is described as a value transmitter, is known from German Patent Document DE-C2-35 14 062. The known device further contains a reading device, which reads and hence monitors codes already present on the check forms and symbols imprinted in the print bay. To this end, there is an examination of security related parts of the inscription on the notes of value prior to the print operation and of the data imprinted by the print head. If, in comparing these data with stored set values, inconsistencies should be revealed, the incorrectly printed check forms are stored in a collecting tray to prevent these incorrectly printed check forms from being handed over to the customer.

Blank checks are produced in printing works, to be precise as individual documents or, in a manner according to the invention, as printed sheets or as form rolls having a plurality of checks arranged thereon. The use of printed sheets or form rolls has and advantages in terms of stock-holding and administration.

SUMMARY OF THE INVENTION

Since blank checks can easily be misused, according to the invention the blank checks are provided on the printed sheets or individually with a consecutive-running number in the form of a control marking. The whereabouts of the checks can thereby be perfectly monitored. The control marking is preferably disposed on the unprinted reverse of the document. The application of the control marking is herein carried out in the printing works, but, where appropriate, it can also be applied in the bank with the use of a corresponding printer. It is in ant event necessary, prior to the delivery of the checks to the customer, to separate the checks by cutting the printed sheets, to provide them with corresponding customer-specific data and to register the control markings. To enable a perfect control to take place, the identification must be registered directly at the site of transfer to the bank customer, i.e. at the delivery point, to be precise in a region in which it is assured that a physical transfer to the customer is also actually carried out.

The aim of the invention is therefore to provide a document printer and a process for the operation of such a document printer, with which invention it is possible, simply and cheaply, to monitor documents directly at the site of transfer to the customer such that, following the control, either a physical transfer to the customer also actually takes place or the documents are determinately withheld.

A further aim of the invention is to design and dispose a reading device, which is necessary to the control, such that there is no need, in order to accommodate it, for any basic alteration to be made to the overall structural design of the document printer.

A further aim of the invention is to design the document printer such that it can be easily converted contingent upon the application.

These and other objects and advantages of the invention are achieved by a method for registering documents by means of control markings using a document printer having a print unit and a conveying channel with an associated transport device which transports the documents in a predefinable transport position through the document printer to an outlet of a document removal bay, having the following features:

a) imprinting a succession of control markings on a succession of documents, consideration being given to the predefinable transport position via a printer, b) feeding the documents into the document printer, c) scanning the control markings on the documents directly before the outlet of the removal bay by means of a reading device, the relative motion of reading device and documents, which relative motion is required for the reading operation, being generated by the transportation of the documents in the document printer.

The invention also provides a document printer having a print unit, a conveying channel with associated transport device, which is suitable for transporting a document up to an output of a document removal bay of the document printer, a reading device disposed in the conveying channel in the direct vicinity of the output of the document removal bay, which reading device scans the document during transportation in the conveying channel, the document being moved by the transport device relative to the reading device, such that the reading device registers a marking disposed, where necessary, on the document.

Advantageous embodiments of the method according to the invention are provided, wherein the step of scanning the control marking or markings is accomplished by means of a reading device disposed stationarily in the conveying channel of the document printer.

The imprinting step provides for imprinting the control marking or markings in a manner extending in the transport direction of the documents. Preferably, the imprinting step provides that the control marking or markings are imprinted on the reverse side of the documents and that the documents are check forms.

As a variation of the present method, the control marking or markings are printed by means of an external printer onto documents which are arranged on printed sheets or form rolls, and a step of separating the documents is carried out within the document printer.

The document printer as described above may have a reading device disposed stationarily in the conveying channel. The reading device is preferably configured as an optical character reading device. Alternately, the reading device is a bar-code reading device or a scanner.

In one arrangement the reading device is disposed in the transport direction of the documents behind the print unit.

As an option, a cutting device is assigned to the conveying channel for separating a plurality of connected documents.

The document printer of one embodiment has a transport device configured as a collecting bay.

A holding device is provided which is assigned to the conveying channel and, where necessary, receives the reading device.

The imprinting of control markings on the reverse of the check forms has the advantage that, in this way, an easy and simple administration and control of the check forms is possible. For the registration of these control markings, a reading device is used which is disposed directly in front of the outlet of a removal bay for the removal of the check forms. The reading device makes use, in a simple manner, of the motion of the check form relative to an stationary scanning device for registering the control marking.

The invention ensures that the checks provided with a customer-specific imprint are identified in the direct vicinity of the outlet of the removal bay on the basis of their control marking. Since no longer any alternative, they must inevitably have come into the possession of the customer and hence left the area of responsibility of the bank. Otherwise they can only be deposited in a reject tray.

The conversion of existing dock, merit printers is particularly simple where the reading device, which can comprise a scanner, a bar-code or an optical character reading device, is disposed stationarily in the conveying channel of the printer. The transport device which is anyway necessary for the transportation of the documents through the printer, e.g. in the form of moved pressure rollers or in the form of a turning or stacking device or a collecting bay, as is described in greater detail in German Patent Application P 42 25 418.3, ensures the relative motion between the paper and the scanner which is necessary for scanning. It is preferable to dispose the scanner or the reading device on the outlet side of the printer, i.e. in a region in which the speed of motion of the documents is at its greatest, since the scanning operation as such generally calls for a minimum relative speed. The reading device is stationarily installed, and in particular is interchangeably mounted in a corresponding holding apparatus, so that, without alteration of the units of the printer, an adaptation of the printer contingent upon the use is possible.

A document printer of this type is versatile in its use, it can either serve alone as a reading device or printer or as a combined instrument which is installed, for example, in an automatic teller machine. In this case, there is the possibility that a customer, by entering a PIN-number, requests an appropriate number of checks. Depending upon its input signal, the document printer is then fed a printed sheet, the checks are separated and personal data are imprinted onto each check. After this, the checks are grasped sheet by sheet by means of a gripping device assigned to a drum, are guided past an OCR (optical character recognition)-reading device, and so the control marking on the reverse of the check is registered by means of an OCR-reading device and collected in the clamping device and then, by reversal of the direction of rotation of the drum, dispensed via a delivery slot. The organization sequence for the production, registration and delivery of the checks is thereby substantially facilitated. Even already existing automatic machines having an integrated document printer can be easily adapted to the desired process sequence.

BRIEF DESCRIPTION OF THE DRAWINGS

An embodiment of the invention is described in greater detail below, by way of example, and is represented in the drawings, in which.

DETAILED DESCRIPTION OF THE PREFERRED EMBODIMENTS

Figure 1:
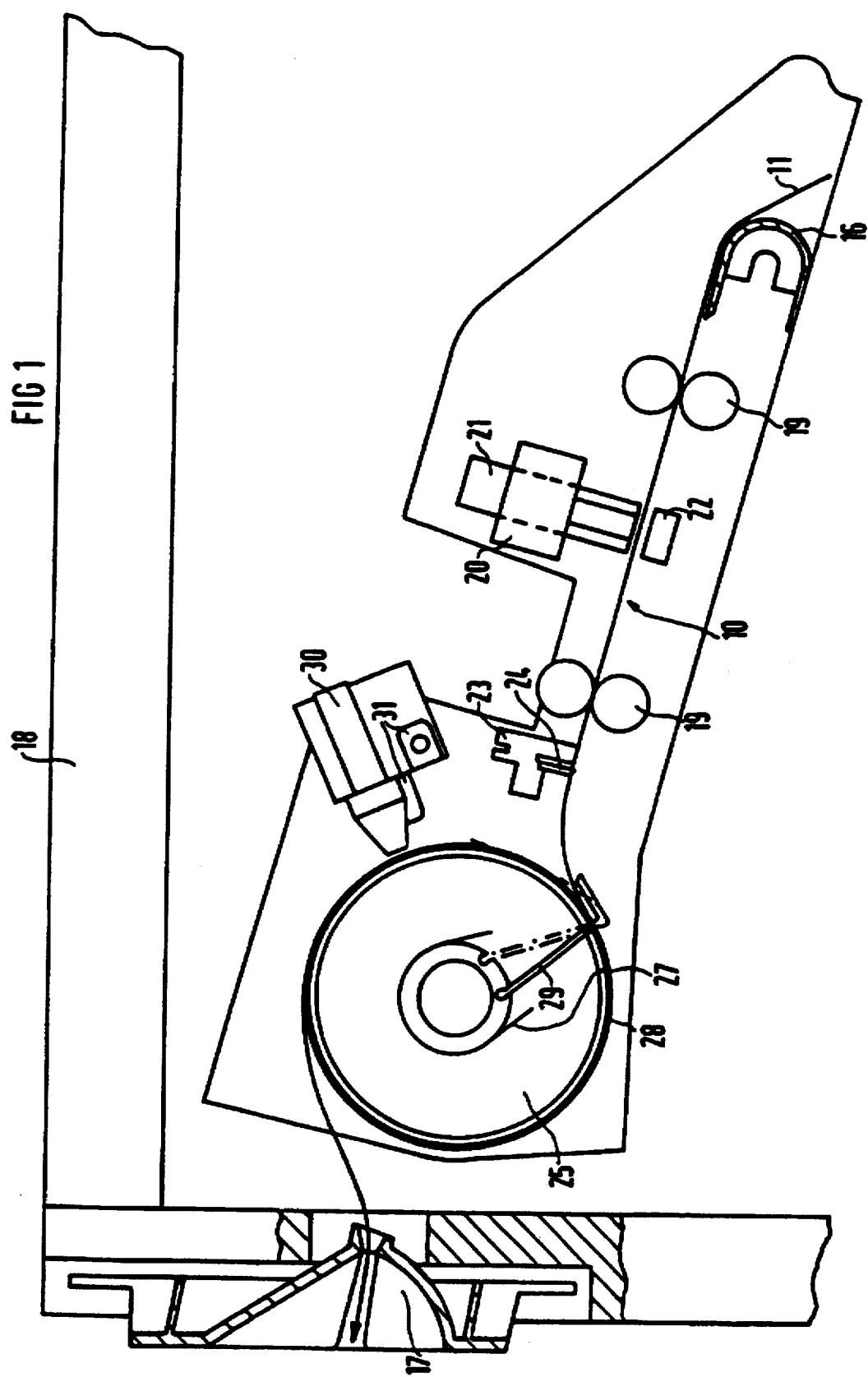
FIG. 1 is a diagrammatic sectional side view of a document printer having an integrated reading device, and FIG. 2 a plan view of a printed sheet having check forms arranged thereon, with an associated control marking on the reverse.

A document or check printer, which is here not represented in detail, contains a transport duct, or convening channel, 10 for transportation of check forms 12 (see FIG. 2), arranged on printed sheets 11, through the document printer. The printed sheets 11 can herein be produced as rolls with the checks 12 imprinted thereon, which checks are connected by a perforated edge 13 to an associated receipt slip 14. A control marking 15, assigned to the checks 12, in the form of a consecutive-running number in OCR-representation is printed on the reverse of the printed sheet 11.

The conveying channel duct 10 extends from an input region 16 (see FIG. 1) of the printer for the feed-in of the printed sheets 11 up to a delivery slot 17 for the delivery of the ready-produced checks, the entire document printer being disposed, in a check dispenser 18, which may be arranged in a vault or safe. Along the conveying channel duct 10 there are disposed the units necessary for document processing. These essentially comprise two pairs of electromotively driven drive rollers 19 with a print head 20, disposed between the drive rollers 19, for printing the documents 11. The print head can comprise a conventional dot-matrix print head with an associated ink-ribbon cassette 21 or an ink print head, which, during printing, is moved perpendicularly to the document transport direction, a pressure bar 22 serving as a support surface for the documents or as a platen for the print head 20.

In the conveying channel 10, disposed downstream of the drive rollers 19 in the transport direction, there is a cutting device 23 having a blade 24, e.g. in the form of a cutting roller, which serves to cut the checks 12 from the form 11, where appropriate with an appended receipt slip 14, and so separate them.

In a continuation of the conveying channel 10 following the cutting device 23, a tuning device, serving as a collecting bay, is disposed with an associated bundling device. This collecting bay 25, which is described in greater detail in German Patent Application P 42 25 418.3, comprises a drum 28 which can be electromotively driven by means of a belt 27, only a portion of which is shown in FIG. 1, and which transports the individual checks 12 by means of a clamp 29. If the appropriate number of checks is deposited in the clamp 29, the direction of rotation of the drum is reversed and the check bundle is dispensed via the delivery slot 17. To this end, the drum is disposed in the direct vicinity of the delivery slot 17 and with the slot forms a removal bay. If the checks are not removed via the delivery slot, they remain in the clamp 29 and hence in engagement with the drum. They are subsequently deposited in a reject tray, which is here not represented yet is described in greater detail in German Patent Application P 42 25 418.3.

In the transport duct in the region of the drum 28, there is disposed an OCR-reading device 30, which scans the control marking 15 located on the reverse of the checks 12, in particular by one sheet after another being gripped by the clamp 29. TO this end, the drum 28 makes one revolution for each check delivery operation, during which the marking of the uppermost check is read. As a result of the nature of the collection of checks in the clamp 29, the sequence of depositing of the checks in the clamp 29 is reversed relative to the feed-in sequence via the transport device 19. After the last check, the direction of rotation of the drum is reversed and the packet of checks is ejected from the delivery slot 17. The customer thereby receives a bundle of checks, which are provided in ascending sequence, for example, with a running number 1–10. The speed of the relative motion between the check and the stationary reading device is, due to the large diameter of the drum 28, relatively high. It corresponds to the transport speed in the transport duct in the region of the transport rollers 19. This assists the reading operation. The reading device 30 is fastened in an exchangeable manner in a mounting 31.

Figure 2:
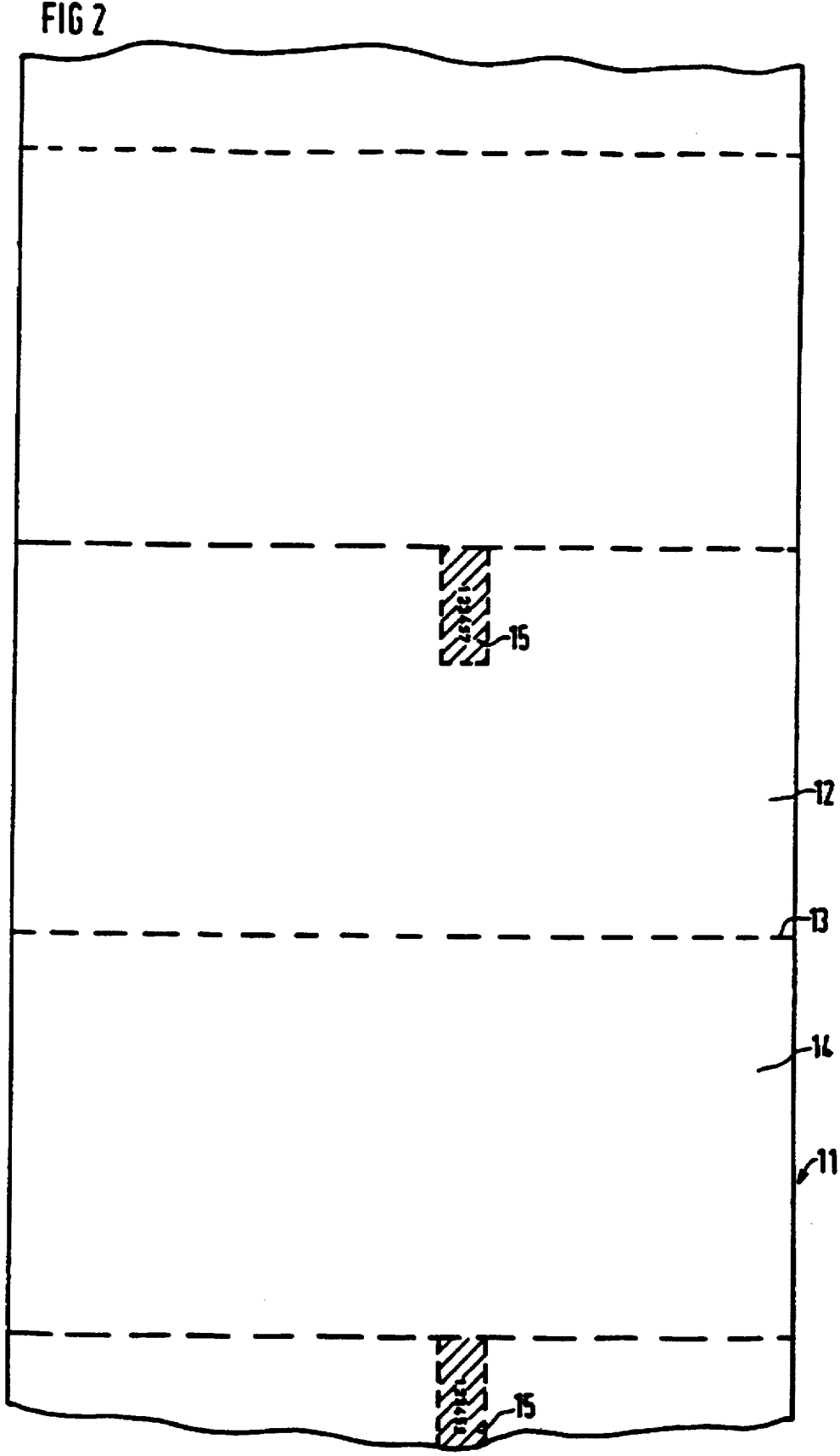

The entire arrangement operates as follows:

In a printing works specializing in the printing of check forms, the blank check forms represented in FIG. 2 are printed on continuous paper 11, e.g. perforated folding paper or roll paper, and provided on their reverse with the control making 15. After this, the check roll is delivered to the bank and inserted there into the corresponding receiving apparatus of the document printer of the check dispenser and, by means of a feed-in procedure, the front edge of the first check is positioned in the region of the print head 20 in a predefinable transport position. The transport position is determined by the positioning of lateral stops of the conveying channel 10 and by a positional location, which is scanned by means of a light barrier, in the region of the print head 20. If, via a keyboard of the check dispenser 18 and following entry of an appropriate PIN-number, a set of checks is requested by a customer, the individual checks 12 are printed by means of the print head 20 with appropriate personal data, e.g. account number, etc., separated by means of the cutting device 23 and deposited in the clamp 29. During the transport motion b7 means of the drum 28, the control marking 15 on the reverse of the check is scanned. Following bundling of the checks and their recording, a corresponding delivery is effected via the delivery slot 17.

In the represented exemplary embodiment, the check forms are already provided with control markings at the printing works. It is possible however, where necessary, to produce the control markings only as the check forms pass through the document printer. This can be carried out, for example, using a separate, detached document printer.

The control marking comprises, in the exemplary embodiment, a consecutive-running number in OCR-representation. In place of the OCR-representation, a bar-code representation is also possible with a corresponding adaptation of the reading device. It is equally conceivable to configure the reading device as a scanner, which can also extend across the entire width of the conveying channel. Much the same also applies to reading devices which are configured as OCR-reading devices or as bar-code reading devices, where, for example, with the aid of these reading devices, a plurality of control markings, disposed for example side by side, are intended to be read.

If, as in the represented exemplary embodiment, consecutive-running numbers in OCR-format are used as control markings, it is sensible and favorable to imprint these on the reverse such that they extend in the transport direction. They can thereby be guided easily past the OCR-reading device 30, in which case the position of this OCR-reading device 30 can be governed by the imprinted track position of the control marking, or indeed, as the control marking is imprinted on the check, consideration is given to the predefined transport position in the printer.

Although other modifications and changes may be suggested by those skilled in the art, it is the intention of the inventors to embody within the patent warranted hereon all changes and modifications as reasonably and properly come within the scope of their contribution to the art.

We claim:

1. A process for registering documents by means of control markings using a document printer having a print unit and a conveying channel with an associated transport device which transports the documents in a predefinable transport position through the document printer to an outlet of a document removal bay, comprising the steps of:

feeding documents into a document printer, imprinting a succession of control markings on a succession of the documents, consideration being given to a predefinable transport position of the documents relative to said document printer during said imprinting step, collecting the documents after said imprinting step in a collecting bay;

scanning the control markings on each document after its arrival in said collecting bay directly before the outlet of the document removal bay by means of a reading device, relative motion of the reading device and the documents as required for the scanning operation being generated by transportation of the documents in the collecting bay so that said control markings of each document are scanned as each document is being removed from said document removal bay.

2. A process as claimed in claim 1, wherein said step of scanning scans the control markings by a reading device disposed stationarily in the conveying channel of the collecting bay.

3. A process as claimed in claim 1, wherein said step of imprinting imprints the control markings in a manner extending in transport direction of the documents.

4. A process for registering documents by means of control markings using a document printer having a print unit and a conveying channel with an associated transport device which transports the documents in a predefinable transport position through the document printer to an outlet of a document removal bay, comprising the steps of:

a) imprinting a succession of control markings on a succession of documents, consideration being given to a predefinable transport position via a printer, b) feeding the documents into the document printer, collecting the documents after said imprinting step in a collecting bay;

c) scanning the control markings on each document after its arrival in said collecting bay directly before the outlet of the removal bay by means of a reading device, relative motion of reading device and documents as required for the scanning operation being generated by transportation of the documents in the collecting bay, wherein said step of imprinting imprints the control markings on a reverse side of the documents which are configured as check forms.

5. A process for registering documents by means of control markings using a document printer having a print unit and a conveying channel with an associated transport device which transports the documents in a predefinable transport position through the document printer to an outlet of a document removal bay, comprising the steps of:

a) imprinting a succession of control markings on a succession of documents, consideration being given to a predefinable transport position via a printer, b) feeding the documents into the document printer, collecting the documents after said imprinting step in a collecting bay;

c) scanning the control markings on each document after its arrival in said collecting bay directly before the outlet of the removal bay by means of a reading device, relative motion of reading device and documents as required for the scanning operation being generated by transportation of the documents in the collecting bay, wherein the step of printing prints the control markings by an external printer onto the documents which are arranged on one of printed sheets and form rolls, and further comprising the step of:

separating the documents out within the document printer.

6. A document printer, comprising:

a print unit, a conveying channel including a collecting bay and with an associated transport device, said transport device being suitable for transporting a document through said conveying channel up to an output of a removal bay of the document printer, a reading device disposed in the conveying channel directly adjacent the output of the removal bay, said reading device scanning the document during transportation of the document in the conveying channel as the document is being output at said removal bay, the document being moved by the transport device relative to the reading device such that the reading device registers a marking disposed, where necessary, on the document as the document is output.

7. A document printer as claimed claim 6, wherein said reading device is a scanner.

8. A document printer as claimed in claim 6, wherein said reading device is an optical character reading device.

9. A document printer as claimed in claim 6, wherein said reading device is disposed, in a transport direction of the documents, behind the print unit.

10. A document printer as claimed in claim 6, further comprising:

a holding device in said conveying channel which removably holds the reading device.

11. A document printer, comprising:

a print unit, a conveying channel including a collecting bay and with an associated transport device, said transport device being suitable for transporting a document through said conveying channel up to an output of a removal bay of the document printer, a reading device disposed in the conveying channel directly adjacent the output of the removal bay, said reading device scanning the document during transportation of the document in the conveying channel as the document is being output at said removal bay, the document being moved by the transport device relative to the reading device such that the reading device registers a marking disposed, where necessary, on the document as the document is output, wherein said collecting bay is a rotatable drum on which the documents are held, and wherein said reading device is disposed stationarily above said rotatable drum.

12. A document printer comprising:

a print unit, a conveying channel including a collecting bay and with an associated transport device, said transport device being suitable for transporting a document through said conveying channel up to an output of a removal bay of the document printer, a reading device disposed in the conveying channel directly adjacent the output of the removal bay, said reading device scanning the document during transportation of the document in the conveying channel as the document is being output at said removal bay, the document being moved by the transport device relative to the reading device such that the reading device registers a marking disposed, where necessary, on the document as the document is output, a cutting device in the conveying channel and operable to separate connected ones of said documents from one another.

* * * * *